US012679957B2

(12) United States Patent (10) Patent No.: US 12,679,957 B2
Mogari (45) Date of Patent: Jul. 14, 2026

(54) RUBBER COMPOSITION FOR TIRES AND TIRE

(71) Applicant: Toyo Tire Corporation, Itami (JP)

(72) Inventor: Keisuke Mogari, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 622 days.

(21) Appl. No.: 18/127,951

(22) Filed: Mar. 29, 2023

(65) Prior Publication Data

US 2023/0331963 A1 Oct. 19, 2023

(30) Foreign Application Priority Data

Apr. 15, 2022 (JP) ................................. 2022-067786

(51) Int. Cl.
| | |
|---|---|
| *C08L 7/00* | (2006.01) |
| *B60C 1/00* | (2006.01) |
| *C08K 9/04* | (2006.01) |
| *C08K 11/00* | (2006.01) |

(52) U.S. Cl.
CPC .............. *C08L 7/00* (2013.01); *B60C 1/0016* (2013.01); *C08K 9/04* (2013.01); *C08K 11/005* (2013.01); *B60C 2200/06* (2013.01); *C08K 2201/005* (2013.01); *C08L 2205/035* (2013.01)

(58) Field of Classification Search
CPC .... C08L 7/00; C08L 2205/035; B60C 1/0016; B60C 1/00; B60C 2200/06; C08K 9/04; C08K 11/005; C08K 2201/005; Y02T 10/86
USPC ........................................................ 523/206
See application file for complete search history.

(56) References Cited

U.S. PATENT DOCUMENTS

| | | | |
|---|---|---|---|
| 2018/0079895 A1 | 3/2018 | Buisman et al. | |
| 2019/0366770 A1* | 12/2019 | Yoshioka .............. | C08L 97/005 |
| 2019/0367705 A1 | 12/2019 | Yoshioka et al. | |
| 2020/0254816 A1* | 8/2020 | Koda .................... | C08F 236/06 |
| 2025/0282934 A1* | 9/2025 | Mogari ................ | C08K 11/005 |

FOREIGN PATENT DOCUMENTS

| | | |
|---|---|---|
| EP | 3-800220 A1 | 4/2021 |
| EP | 3922670 A1 | 12/2021 |
| JP | H10-7841 A | 1/1998 |
| JP | H11-246711 A | 9/1999 |
| JP | 2010-265427 A | 11/2010 |
| JP | 2019-530793 A | 10/2019 |
| JP | 2019-206651 A | 12/2019 |
| JP | 2020-189925 A | 11/2020 |
| JP | 2021-054377 A | 4/2021 |
| JP | 2021-172227 A | 11/2021 |
| JP | 2021-195000 A | 12/2021 |

OTHER PUBLICATIONS

Office Action dated Dec. 23, 2025, issued in counterpart JP Application No. 2022-067786, with English translation. (12 pages).
Office Action dated Mar. 17, 2026, issued in counterpart JP Application No. 2022-067786, with English translation. (8 pages).

* cited by examiner

*Primary Examiner* — Hannah J Pak

(74) *Attorney, Agent, or Firm* — WHDA, LLP

(57) ABSTRACT

A rubber composition for tires according to an embodiment includes, per 100 parts by mass of a rubber component, 0.1 to 20 parts by mass of a terpene-based resin containing an α-pinene unit and a β-pinene unit, and 1 to 30 parts by mass of vegetable granules having an average particle size of 0.1 to 500 μm.

17 Claims, No Drawings

RUBBER COMPOSITION FOR TIRES AND TIRE

BACKGROUND OF THE INVENTION

Field of the Invention

The present invention relates to a rubber composition for tires and also to a tire using the same.

Description of Related Art

In a rubber composition for tires, it is known to blend a terpene-based resin (see JPH11-246711A, JP2021-054377A, and JP2019-530793A). For example, JPH11-246711A describes that in order to improve grip performance on snow or ice, a tackifier such as a terpene resin is blended into a diene rubber together with a softener-containing norbornene-based polymer.

JP2021-054377A describes that in order to improve overall performance including on-ice performance and wear performance, a terpene-based resin having an α-pinene unit content of 65 to 100 mass % and a β-pinene unit content of 0 to 35 mass % is blended into an isoprene-based rubber and a butadiene rubber.

SUMMARY OF THE INVENTION

Performances required for tires include grip performance on frozen road surfaces (i.e., on-ice performance) and grip performance on wet road surfaces (i.e., wet grip performance). In addition, wear resistance is required from the viewpoint of tire life, and low heat generation properties further are required from the viewpoint of fuel efficiency. However, it is difficult to improve these performances in a well-balanced manner, that is, to satisfy the performances at the same time without deteriorating any of them, and further improvements are required.

An object of some embodiments of the invention is to provide a rubber composition for tires, which is capable of improving on-ice performance, wear resistance, low heat generation properties, and wet grip performance in a well-balanced manner, and also a tire using the same.

The invention encompasses the following embodiments.

[1] A rubber composition for tires, including, per 100 parts by mass of a rubber component, 0.1 to 20 parts by mass of a terpene-based resin containing an α-pinene unit and a β-pinene unit, and 1 to 30 parts by mass of vegetable granules having an average particle size of 0.1 to 500 μm.

[2] The rubber composition for tires according to [1], further including 0.1 to 20 parts by mass of a rosin-based resin and/or a petroleum resin,

[3] The rubber composition for tires according to [1] or [2], wherein the vegetable granules include surface-treated vegetable granules that have been subjected to a surface treatment with a resin liquid of a rubber adhesion improver and non-treated vegetable granules that have not been subjected to the surface treatment.

[4] The rubber composition for tires according to any one of [1] to [3], for heavy-duty tires.

[5] A tire made using the rubber composition for tires according to any one of [1] to [4].

According to an embodiment of the invention, on-ice performance, wear resistance, low heat generation properties, and wet grip performance can be improved in a well-balanced manner.

DESCRIPTION OF EMBODIMENTS

A rubber composition for tires according to this embodiment (hereinafter also referred to as a "rubber composition") includes (A) a rubber component, (B) a terpene-based resin, and vegetable granules. In one embodiment, it is preferable that the rubber composition further includes (D) a rosin-based resin and/or (E) a petroleum resin.

[(A) Rubber Component]

As a rubber component, a diene rubber is used. A diene rubber refers to a rubber with a repeating unit corresponding to a diene monomer having a conjugated double bond, and has a double bond in the polymer backbone. As specific examples of the diene rubber, various diene rubbers commonly used in rubber compositions, such as a natural rubber (NR), an isoprene rubber (IR), a butadiene rubber (BR), a styrene butadiene rubber (SBR), a nitrile rubber (NBR), a chloroprene rubber (CR), a styrene-isoprene copolymer rubber, a butadiene-isoprene copolymer rubber, and a styrene-isoprene-butadiene copolymer rubber, can be mentioned. They can be used alone, and it is also, possible to use a combination of two or more kinds. Incidentally, the concept of the above diene rubbers also encompasses those modified at the terminal or backbone as necessary (e.g., terminally modified SBR) and those modified to impart desired characteristics (e.g., modified NR).

In one embodiment, it is preferable that the rubber component includes at least one selected from the group consisting of a natural rubber, a styrene butadiene rubber, and a butadiene rubber. It is more preferable that the rubber component includes a natural rubber and a butadiene rubber. It is preferable that 100 parts by mass of the rubber component includes 40 to 90 parts by mass of a natural rubber and 10 to 60 parts by mass of a butadiene rubber. It is more preferable that 100 parts by mass of the rubber component includes 50 to 80 parts by mass of a natural rubber and 20 to 50 parts by mass of a butadiene rubber. It is still more preferable that 100 parts by mass of the rubber component includes 55 to 70 parts by mass of a natural rubber and 30 to 45 parts by mass of a butadiene rubber.

[(B) Terpene-Based Resin]

A terpene-based resin is a resin having a unit derived from a terpene compound, and, in this embodiment, one containing an α-pinene unit and a β-pinene unit is used. It is preferable that a terpene-based resin composed of a copolymer containing an α-pinene unit and a β-pinene unit is used as the terpene-based resin. A terpene-based resin containing an α-pinene unit and a β-pinene unit is highly compatible with the rubber component and has excellent dispersibility in the rubber component. Therefore, along with being blended together with vegetable granules, such a resin can be expected to improve on-ice performance, wear resistance, low heat generation properties, and wet grip performance in a well-balanced manner.

An α-pinene unit is a unit derived from α-pinene. A β-pinene unit is a unit derived from β-pinene. A terpene-based resin containing an α-pinene unit and a β-pinene unit can be obtained by polymerizing a mixture containing α-pinene and β-pinene. The mass ratio between the α-pinene unit and the β-pinene unit is not particularly limited, but is preferably 35:65 to 4:96, more preferably 20:80 to 4:96, and still more preferably 10:90 to 4:96. In one embodiment, the α-pinene unit content in the terpene-based resin is preferably 4 to 35 mass %, more preferably 4 to 20 mass %, and still more preferably 4 to 10 mass %. The β-pinene unit content in the terpene-based resin is preferably 65 to 96 mass %, more preferably 80 to 96 mass %, and still more preferably 90 to 96 mass %.

It is possible that the terpene-based resin contains only α-pinene and β-pinene as its constituent monomers. However, as long as the effect not impaired, other terpene compounds and further monomers other than terpene compounds may also be contained. In one embodiment, the terpene-based resin may be a polyterpene resin obtained by polymerizing only a terpene compound (terpene monomer), that is, may be a polyterpene resin containing an α-pinene unit and a β-pinene unit.

In one embodiment, it is preferable that the terpene-based resin contains substantially no limonene unit, which is a unit derived from limonene. For example, the limonene unit content in the terpene-based resin may be less than 10 mass %, less than 5 mass %, less than 2 mass %, less than 1 mass %, or 0 mass %.

The method for synthesizing a terpene-based resin is not particularly limited. For example, the terpene-base resin can be synthesized by cationically polymerizing a monomer mixture containing α-pinene and β-pinene using a Lewis acid catalyst. Specific examples of Lewis acid catalysts include, but are not particularly limited to, metal halides (e.g., $BF_3$, $BBr_3$, $AlF_3$, $AlBr_3$, $TiCl_4$, $TiBr_4$, $FeCl_3$, $FeCl_2$, $SnCl_4$, $WCl_6$, $MoCl_5$, $ZrCl_4$, $SbCl_3$, $SbCl_5$, $TeCl_2$, and $ZnCl_2$), metal alkyl compounds (e.g., $Et_3Al$, $Et_2AlCl$, $EtAlCl_2$, $Et_3Al_2Cl_3$, $(iBu)_3Al$, $(iBu)_2AlCl$, $(iBu)AlCl_2$, $Me_4Sn$, $Et_4Sn$, $Bu_4Sn$, and $Bu_3SnCl$), and metal alkoxy compounds (e.g., $Al(OR)_{3-x}Cl_x$ and $Ti(OR)_{4-y}Cl_y$ (wherein R represents an alkyl group or an aryl group, x represents an integer of 1 or 2, and y represents an integer of 1 to 3) Here, Et represents an ethyl group, iBu represents an isobutyl group, Me represents a methyl group, and Bu represents a butyl group.

In one embodiment, it is preferable that the terpene-based resin has a softening point of 60 to 150° C., more preferably 70 to 140° C., and still more preferably 80 to 130° C. The softening point is measured in accordance with ASTM D6090 (published in 1997).

In one embodiment, it is preferable that the terpene-based resin has a glass transition temperature (Tg) of 38 to 81° C. Tg is measured in accordance with ASTM D6604 (published in 2013) using a differential scanning calorimeter SC Q2000 manufactured by TA instruments.

The terpene-based resin content is, per 100 parts by mass of the rubber component, preferably 0.1 to 20 parts by mass, more preferably 0.5 to 10 parts by mass, still more preferably 0.8 to 7 parts by mass, and particularly preferably 1 to 5 parts by mass.

[(C) Vegetable Granules]

As vegetable granules, pulverized products of seed husks, fruit pits, grains and their core materials, and the like can be mentioned, and at least one kind thereof can be blended. For example, pulverized products of fruit pits and seed husks such as walnut, apricot, camellia, peach, plum, ginkgo nut, peanut, and chestnut, pulverized products of grains such as rice, wheat, millet, Japanese millet, and corn, pulverized products of grain core materials such as corn cob, and the like can be mentioned. They have a Mohs hardness of about 2 to 5 and are harder than ice, and thus can exert a scratching effect on icy and snowy road surfaces. In addition, among such anti-slip materials having a scratching effect, vegetable granules can improve, when used in combination with a terpene-based resin, on-ice performance, low heat generation properties, and wet grip performance without impairing wear resistance.

As vegetable granules, those having an average particle size of 0.1 to 500 μm are preferably used. It is preferable that the vegetable granules have an average particle size of 10 to 500 μm, more preferably 100 to 400 μm, and still more preferably 150 to 300 μm. Here, the average particle size of vegetable granules is a 90% volume particle size (D90), which means the particle size at a cumulative value of 90% in particle size distribution (volume basis) measured by a laser diffraction/scattering method. For example, the average particle size can be determined using a laser diffraction particle size distribution analyzer "SALD-2200" manufactured by Shimadzu Corporation, which uses a red semiconductor laser (wavelength: 680 nm) as a light source.

It is preferable that the vegetable granules used have been surface-treated with a resin liquid of a rubber adhesion improver in order to improve compatibility with the rubber component and prevent shedding. As the rubber adhesion improver, for example, the mixture of a resorcin-formalin resin precondensate and a natural rubber latex or a diene-based synthetic rubber latex described in JPH10-7841A can be mentioned.

In one embodiment, it is preferable that the vegetable granules include surface-treated vegetable granules that have been subjected to a surface treatment with a resin liquid of a rubber adhesion improver and non-treated vegetable granules that have not been subjected to such a surface treatment. As a result of the combined use of surface-treated vegetable granules and non-treated vegetable granules, on-ice performance can be further improved. In the case of such combined use, the mass ratio between surface-treated vegetable granules and non-treated vegetable granules is not particularly limited, but is preferably 20:80 to 60:40, more preferably 30:70 to 50:50, and particularly preferably 30:70 to 45:55. It is preferable to blend more non-treated vegetable granules than surface-treated vegetable granules. In addition, in the case of combined use, the average particle size relationship between the two is not particularly limited, but it is preferable that the average particle size of surface-treated vegetable granules is larger than the average particle size of non-treated vegetable granules.

The vegetable granule content is, per 100 parts by mass of the rubber component, preferably 1 to 30 parts by mass, more preferably 2 to 20 parts by mass, still more preferably 3 to 10 parts by mass, and particularly preferably 3 to 8 parts by mass.

[(D) Rosin-Based Resin]

The rubber composition according to this embodiment may have blended therein a rosin-based resin. As a result of adding a rosin-based resin, wear resistance can be remarkably improved without impairing the on-ice performance, low heat generation properties, and wet grip performance resulting from the combined use of a terpene-based resin and vegetable granules.

A rosin-based resin is a resin containing rosin acid as a main component. As rosin-based resins, for example, raw material rosins such as gum rosin, wood rosin, and tall oil rosin, disproportionated products of raw material rosins, stabilized rosins obtained by hydrogenation-treating raw material rosins, polymerized rosins, and like rosins, esterified products of rosins (rosin ester resins), phenol-modified rosins, unsaturated acid- (e.g., maleic acid-) modified rosins, formylated rosins obtained by reduction-treating rosins, and like various known ones can be used.

The rosin-based resin content is not particularly limited and is, for example, per 100 parts by mass of the rubber component, preferably 0.1 to 20 parts by mass, more preferably 0.5 to 10 parts by mass, and still more preferably 0.8 to 5 parts by mass.

[(E) Petroleum Resin]

The rubber composition according to this embodiment may have blended therein a petroleum resin. As a result of adding a petroleum resin, wear resistance and wet grip performance can be improved without impairing the on-ice performance and low heat generation properties resulting from the combined use of a terpene-based resin and vegetable granules.

As petroleum resins, aliphatic petroleum resins, aromatic petroleum resins, and aliphatic/aromatic copolymer petroleum resins can be mentioned. An aliphatic petroleum resin (also referred to as "C5-based petroleum resin") is a resin obtained by the cationic polymerization of an unsaturated monomer such as isoprene or cyclopentadiene, which is a petroleum fraction equivalent to four to five carbon atoms (C5 fraction), and may also be hydrogenated. An aromatic petroleum resin (also referred to as "C9-based petroleum resin") is a resin obtained by the cationic polymerization of a monomer such as vinyltoluene, an alkylstyrene, or indene, which is a petroleum fraction equivalent to eight to ten carbon atoms (C9 fraction), and may also be hydrogenated. An aliphatic/aromatic copolymer petroleum resin (also referred to as "C5/C9-based petroleum resin") is a resin obtained by the copolymerization of the above C5 fraction and C9 fraction, and may also be hydrogenated.

The petroleum resin content is not particularly limited and is, for example, per 100 parts by mass of the rubber component, preferably 0.1 to 20 parts by mass, more preferably 0.5 to 10 parts by mass, and still more preferably 0.8 to 5 parts by mass. Incidentally, in the case of combined use of a rosin-based resin and a petroleum resin, the total of the rosin-based resin and the petroleum resin is, per 100 par is by mass of the rubber component, preferably 0.1 to 20 parts by mass, more preferably 0.5 to 10 parts by mass, and still more preferably 0.8 to 5 parts.

[Other Components]

In addition to the above components, the rubber composition according to this embodiment may have blended therein various additives generally used in rubber compositions, such as a filler, zinc oxide, stearic acid, an antioxidant, an oil, a wax, a vulcanizing agent, and a vulcanization accelerator.

As a filler, carbon black and/or silica is preferably used. It is more preferable that the filler contains carbon black. Combined use of carbon black and silica as a filler is also possible. Incidentally, in the case where silica is blended, a silane coupling agent may be used together.

Carbon black is not particularly limited, and known various species can be used. Specifically, SAF grade (N100s), ISAF grade (N200s), HAF grade (N300s), FEF grade (N500s) (all ASTM grades), and the like can be mentioned. These grades of carbon black may be used alone, and it is also possible to use a combination of two or more kinds. Silica is not particularly limited, and wet silica, dry silica, and the like can be mentioned. Wet silica, such as wet-precipitated silica or wet-gelled silica, is preferably used as silica.

The filler content is not particularly limited and may be, for example, per 100 parts by mass of the rubber component, 20 to 100 parts by mass, or 30 to 80 parts by mass. The filler may contain carbon black as a main component. That is, the amount of carbon black based on the total mass of the filler may be more than 50 mass %, 70 mass % or more, or 100 mass %.

As a vulcanizing agent, sulfur is preferably used. The vulcanizing agent content is not particularly limited and is, per 100 parts by mass of the rubber component, preferably 0.1 to 10 parts by mass, and more preferably 0.5 to 5 parts by mass, and may also be 1 to 3 parts by mass.

As a vulcanization accelerator, for example, sulfenamide-based, thiuram-based, thiazole-based, guanidine-based, and like various vulcanization accelerators can be mentioned. They may be used alone, and it is also possible to use a combination of two or more kinds. The vulcanization accelerator content is not particularly limited and is, per 100 parts by mass of the rubber component, preferably 0.1 to 7 parts by mass, and more preferably 0.5 to 5 parts by mass, and may also be 1 to 3 parts by mass.

The rubber composition according to this embodiment can be made by kneading in the usual manner using a commonly used mixer, such as a Banbury mixer, a kneader, or a roll. That is, for example, in the first mixing stage (non-productive kneading step), additives other than a vulcanizing agent and a vulcanization accelerator are added to a rubber component together with a terpene-based resin and vegetable granules, and mixed. Next, in the final mixing stage (productive kneading step), a vulcanizing agent and a vulcanization accelerator are added to the obtained mixture and mixed. As a result, an unvulcanized rubber composition can be prepared.

The rubber composition according to this embodiment can be used as a rubber composition for tires. As tires, pneumatic tires of various sizes for various applications, including passenger car tires, heavy-duty tires for trucks and buses, and the like, can be mentioned. It is preferable that the rubber composition is used as a rubber composition for heavy-duty tires.

A tire according to one embodiment is a tire made using the above rubber composition. That is, the tire has a rubber part made of the above rubber composition. As application sites in a tire, for example, a tread rubber, a sidewall rubber, and the like can be mentioned, and a tread rubber is preferable.

Some tire tread rubbers have a two-layer structure of a cap rubber and a base rubber, while others have a single-layer structure having the two integrated. In the case of a single-layer structure, the tread rubber may be formed from the above rubber composition. In the case of a two-layer structure, the outer can rubber contacting the road surface may be formed from the above rubber composition, the base rubber arranged on the inner side of the cap rubber may be formed from the above rubber composition, or both the cap rubber and the base rubber may be formed from the above rubber composition.

The method for producing a tire is not particularly limited. For example, the above rubber composition is formed into a predetermined shape by extrusion in the usual manner, and then combined with other parts to make an unvulcanized tire (green tire). For example, the above rubber composition is used to make a tread rubber, and then the tread rubber is combined with other tire members to make an unvulcanized tire. Subsequently, vulcanization molding is performed at 140 to 180° C., for example, whereby a tire can be produced.

EXAMPLES

Examples will be shown hereinafter, but the invention is not limited to these examples.

Using a Banbury mixer, following the formulations (parts by mass) shown in Table 1 below, first, in the first mixing stage, ingredients excluding sulfur and a vulcanization accelerator were added to a rubber component and kneaded (discharge temperature=160° C.) Next, in the final mixing stage, sulfur and a vulcanization accelerator were added to the obtained kneaded product and kneaded (discharge temperature=90° C.) to prepare a rubber composition. The details of the components in Table 1 are as follows.

Natural rubber: RSS #3

Butadiene rubber: "BR150B" manufactured by Ube Industries, Ltd.

Carbon black: "SEAST 6" manufactured by Tokai Carbon Co., Ltd.

Zinc oxide: "Type 2 Zinc Oxide" manufactured by Mitsui Mining & Smelting Co., Ltd.

Stearic acid: "Beads Stearic Acid" manufactured by NOF Corporation

Non-treated vegetable granules: Walnut husk pulverized product ("SOFT GRIT #46" manufactured by Nippon Walnut Co., Ltd., D90=400 μm)

Surface-treated vegetable granules: Walnut husk pulverized product ("SOFT GRIT #46" manufactured by Nippon Walnut Co., Ltd.), surface-treated with an RFL treatment liquid (containing, as a main component, a mixture of a resorcin-formalin resin precondensate and a latex) in accordance with the method described in JPH10-7841A, paragraph 0015, (D90=300 μm).

Oil: Aromatic, "Process NC-140" manufactured by JXTG Nippon Oil & Energy Corporation Terpene-based resin: α-Pinene/β-pinene mixed resin, "SYLVATRAXX 4150" manufactured by Kraton (α-pinene unit: 5 mass %, β-pinene unit: 95 mass %, softening point: 115° C., Tg: 61° C.)

Rosin-based resin: Rosin, "TR-80" manufactured by IREC Co., Ltd.

Petroleum resin: C5/C9-based petroleum resin, "Petrotack 90" manufactured by Tosoh Corporation Antioxidant: "Nocrac 6C" manufactured by Ouchi Shinko Chemical Industrial Co., Ltd.

Sulfur: "Powder Sulfur" manufactured by Tsurumi Chemical Industry Co., Ltd.

Vulcanization accelerator: "SOXINOL CZ" manufactured by Sumitomo Chemical Co., Ltd.

Each rubber composition obtained was evaluated for on-ice performance, wear resistance, low heat generation properties, and wet grip performance. The evaluation methods are as follows On-Ice Performance: Using each rubber composition as a tread rubber, a heavy-duty pneumatic tire (tire size: 11.5R22.5 14PR) was made by vulcanization molding in the usual manner. The obtained tire was mounted on a 25-ton truck and run on a −3±3° C. icy road at 30 km/h, sudden braking was then applied (ABS not activated), and the braking distance (m) was measured. The reciprocal of the braking distance (average, n=10) was compared and expressed as an index taking the value in Comparative Example 1 as 100. The larger the index, the shorter the braking distance, indicating better one-ice performance.

Wear Resistance: Each rubber composition was vulcanized at 160° C. for 30 minutes to prepare a test piece, and the abrasion loss was measured in accordance with JIS K6264 using a Lambourn abrasion tester at a load of 3 kg, a slip ratio of 20%, a temperature of 23° C., and a sand fall rate of 20 g/min. The reciprocal of the abrasion loss was compared and expressed as an index taking the value of Comparative Example 1 as 100. The larger the index, the smaller the abrasion loss, indicating better wear resistance.

Low Heat Generation Properties: A tire made as described in the on-ice performance evaluation method was used. Immediately after drum running under the high-speed durability test conditions specified in the Federal Motor Vehicle Safety Standards FMVSS 119, a thermistor was inserted at a belt edge position with the maximum tread thickness on the belt to measure the temperature. The result was expressed as an index calculated by the following formula. The higher the value is, the less likely heat is to be generated, indicating better low heat generation properties.

(Temperature of the tire of Comparative Example 1)×100/(temperature of each prototype tire)

Wet Grip Performance: A tire made as described in the on-ice performance evaluation method was used. A vehicle equipped with 50% worn tires entered a road surface with a water depth of 5 mm at a speed of 40 km/h, and sudden braking was then applied. The braking distance at that time was measured, and its reciprocal was calculated as an index. The performance was evaluated by the index, taking the result of Comparative Example 1 as 100. The larger the index, the shorter the braking distance, indicating better wet grip performance.

TABLE 1

| | Comparative Example 1 | Example 1 | Example 2 | Example 3 | Example 4 | Example 5 | Example 6 | Example 7 | Example 8 | Example 9 |
|---|---|---|---|---|---|---|---|---|---|---|
| Formulation (parts by mass) | | | | | | | | | | |
| Natural rubber | 60 | 60 | 60 | 60 | 60 | 60 | 60 | 60 | 60 | 60 |
| Butadiene rubber | 40 | 40 | 40 | 40 | 40 | 40 | 40 | 40 | 40 | 40 |
| Carbon black | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Non-treated vegetable granules | 3 | 3 | 3 | 3 | 3 | 3 | 3 | 3 | 3 | 3 |
| Surface-treated vegetable granules | 2 | 2 | 2 | 2 | 2 | 2 | 2 | 2 | 2 | 2 |
| Oil | 2 | 2 | 2 | 2 | 2 | 2 | 2 | 2 | 2 | 2 |
| Terpene-based resin | — | 1 | 3 | 5 | 2 | 1 | 2.5 | 2 | 1 | 2.5 |
| Rosin-based resin | — | — | — | — | 1 | 2 | 2.5 | — | — | — |
| Petroleum resin | — | — | — | — | — | — | — | 1 | 2 | 2.5 |
| Antioxidant | 1 | 1 | 1 | 1 | 1 | 1 | 1 | 1 | 1 | 1 |
| Sulfur | 1 | 1 | 1 | 1 | 1 | 1 | 1 | 1 | 1 | 1 |

TABLE 1-continued

| | Comparative Example 1 | Example 1 | Example 2 | Example 3 | Example 4 | Example 5 | Example 6 | Example 7 | Example 8 | Example 9 |
|---|---|---|---|---|---|---|---|---|---|---|
| Vulcanization accelerator | 2 | 2 | 2 | 2 | 2 | 2 | 2 | 2 | 2 | 2 |
| Evaluation | | | | | | | | | | |
| On-ice performance | 100 | 107 | 112 | 114 | 110 | 107 | 113 | 111 | 108 | 113 |
| Wear resistance | 100 | 101 | 102 | 103 | 110 | 113 | 115 | 103 | 104 | 107 |
| Low heat generation properties | 100 | 103 | 110 | 112 | 106 | 103 | 108 | 105 | 103 | 107 |
| Wet grip performance | 100 | 102 | 105 | 107 | 104 | 102 | 105 | 106 | 108 | 111 |

The results are as shown in Table 1. In Comparative Example 1, although vegetable granules are blended, no terpene-based resin is blended. As compared with such Comparative Example 1, in Examples 1 to 3, where a terpene-based resin and vegetable granules were blended, it was possible to improve on-ice performance, low heat generation properties, and wet grip performance while maintaining or improving wear resistance, and the improving effects on on-ice performance and low heat generation properties were especially excellent. In Examples 4 to 6, in addition to a terpene-based resin and vegetable granules, a rosin-based resin is further blended. In Examples 4 to 6, as compared with Examples 1 to 3, it was possible to significantly improve wear resistance while maintaining on-ice performance, low heat generation properties, and wet grip performance. In Examples 7 to 9, in addition to a terpene-based resin and vegetable granules, a petroleum resin is further blended. In Examples 7 to 9, as compared with Examples 1 to 3, it was possible to improve wet grip performance and wear resistance while maintaining on-ice performance and low heat generation properties.

Incidentally, with respect to the various numerical ranges described herein, the upper and lower limits thereof can be arbitrarily combined, and all such combinations are incorporated herein as preferred numerical ranges. In addition, the description of a numerical range "X to Y" means X or more and Y or less.

Although some embodiments of the invention have been described above, these embodiments are presented as examples and not intended to limit the scope of the invention. These embodiments can be implemented in other various modes, and, without departing from the gist of the invention, various omissions, substitutions, and changes can be made thereto. These embodiments, as well as omissions, substitutions, and changes thereto, etc., fall within the scope and gist of the invention, and also fall within the scope of the claimed invention and its equivalents.

What is claimed is:

1. A rubber composition for tires, comprising, per 100 parts by mass of a rubber component, 0.1 to 20 parts by mass of a terpene-based resin comprising an α-pinene unit and a β-pinene unit, and 1 to 30 parts by mass of vegetable granules having an average particle size of 0.1 to 500 μm, wherein the α-pinene unit content in the terpene-based resin is 4 to 10 mass %, and the β-pinene unit content in the terpene-based resin is 90 to 96 mass %.

2. The rubber composition for tires according to claim 1, further comprising 0.1 to 20 parts by mass of a rosin-based resin and/or a petroleum resin.

3. The rubber composition for tires according to claim 1, wherein the content of the terpene-based resin is 1 to 5 parts by mass per 100 parts by mass of the rubber component, the average particle size of the vegetable granules is 100 to 400 μm, and the vegetable granules include surface-treated vegetable granules that have been subjected to a surface treatment with a resin liquid of a rubber adhesion improver and non-treated vegetable granules that have not been subjected to the surface treatment.

4. The rubber composition for tires according to claim 2, wherein the content of the terpene-based resin is 1 to 5 parts by mass per 100 parts by mass of the rubber component, the average particle size of the vegetable granules is 100 to 400 μm, and the vegetable granules include surface-treated vegetable granules that have been subjected to a surface treatment with a resin liquid of a rubber adhesion improver and non-treated vegetable granules that have not been subjected to the surface treatment.

5. The rubber composition for tires according to claim 1, wherein 100 parts by mass of the rubber component further includes 40 to 90 parts by mass of a natural rubber and 10 to 60 parts by mass of a butadiene rubber.

6. The rubber composition for tires according to claim 1, wherein the terpene-based resin has a softening point of 60 to 150° C.

7. The rubber composition for tires according to claim 1, wherein the terpene-based resin has a glass transition temperature of 38 to 81° C.

8. A tire made from the rubber composition for tires according to claim 1.

9. A tire made from the rubber composition for tires according to claim 2.

10. A tire made from the rubber composition for tires according to claim 3.

11. A tire made from the rubber composition for tires according to claim 4.

12. A tire made from the rubber composition for tires according to claim 5.

13. A tire made from the rubber composition for tires according to claim 6.

14. A tire made from the rubber composition for tires according to claim 7.

15. The tire according to claim 8, being a heavy-duty tire.

16. The rubber composition for tires according to claim 3, wherein the content of the vegetable granules is 3 to 10 parts by mass per 100 parts by mass of the rubber component.

17. A tire made from the rubber composition for tires according to claim 16.

* * * * *